United States Patent Office 2,863,509
Patented Dec. 9, 1958

2,863,509

TREATMENT OF WELLS

Joseph U. Messenger, William R. Foster, and Sherrod A. Williams, Jr., Dallas, and Laurence M. Hermes, Jr., Houston, Tex.; said Messenger and said Foster assignors, by mesne assignments, to Socony Mobil Oil Company, Inc., a corporation of New York No Drawing. Application October 22, 1953
Serial No. 387,796

17 Claims. (Cl. 166—29)

This invention relates to the treatment of well bore holes in the earth and relates more particularly to a method and composition for the treatment of such well bore holes.

In the drilling of well bore holes in the earth, as, for example, wells for petroleum oil or gas, lost circulation of drilling fluid is frequently encountered by reason of the drilling fluid flowing into highly permeable or cavernous formations with consequent increase in the cost of drilling the well and often impossibility of continuing the drilling. In recompletion or acidizing procedures for initiating or stimulating production of desired fluids from a producing formation penetrated by a well, it is often necessary or desirable to protect neighboring earth formations from the effects of the recompletion or acidizing procedures. Similarly, it is often necessary or desirable, in water flooding or gas drive operations for increasing the recovery of petroleum oil from a subterranean formation, to prevent the flow of injection water and gas into neighboring formations. Additionally, in connection with casings in a well bore, they often require securing in place, holes or perforations may occur therein, or they are subjected to a corrosive environment. For each of these conditions, as well as for others, treatment of the well bore hole is indicated.

It is an object of this invention to treat a well bore hole in the earth. It is another object of this invention to provide a method and composition for treating a well bore hole in the earth. It is another object of this invention to correct lost circulation of drilling fluid in the drilling of a well bore hole in the earth. It is another object of this invention to protect earth formations in a well bore hole in the earth from effects of recompletion and acidizing procedures applied to a neighboring producing formation. It is another object of this invention to prevent flow of injection water or gas into formations in the neighborhood of a petroleum-containing formation. It is another object of this invention to seal holes or perforations in well casing. It is another object of this invention to protect well casing against a corrosive environment. These and other objects of the invention will become apparent from the following detailed description thereof.

In accordance with the invention, there is provided a composition comprising a monovalent montmorillonite which has been subjected to heating for such a time and at such a temperature that at least a portion of the interlaminar water is removed therefrom, an aqueous slurry of which composition is placed in a well bore hole in the earth at a desired location and permitted to set therein.

Monovalent montmorillonites have the property, when contacted with liquid water, of hydrating and dispersing. The mechanism of hydration and dispersion is a two-step process. In the first step, the hydration step, the liquid water enters between the laminae of the montmorillonite particles, causing a lattice expansion or swelling. The second step, the dispersion step, occurs when the lattice expansion or swelling resulting from the hydration step increases the thickness of the particles to about ten times their original thickness and the laminae separate from one another. The resultant immobilization of the water causing the lattice expansion or swelling and the resultant formation of many small asymmetric particles from the separation of the laminae impart an increased viscosity to the suspension depending upon the concentration of the monovalent montmorillonite in the water and the degree of dispersion of the laminae. The rate and extent of the hydration and dispersion of the laminae vary somewhat with the type of monovalent montmorillonite. With most monovalent montmorillonites, the hydration and dispersion occur almost immediately upon admixture with the liquid water. With a few types of monovalent montmorillonites, however, the rate of hydration and dispersion is slower.

We have found that, by heating a monovalent montmorillonite for a time and at a temperature sufficient to remove at least a portion of the interlaminar water, a product is formed, an aqueous slurry of which has, from the standpoint of the treatment of a well bore hole in the earth, improved properties with respect to the rate at which hydration and dispersion occur and consequently with respect to the rate at which the slurry will increase in viscosity with time. By interlaminar water is meant the non-liquid water contained between the laminae of the monovalent montmorillonite, some of which is associated with the surface cations of the monovalent montmorillonite. By the heating procedure, the rate at which the resulting monovalent montmorillonite hydrates and disperses in the presence of liquid water is significantly retarded. A monovalent montmorillonite which hydrates and disperses almost immediately upon admixture with liquid water hydrates and disperses only slowly after it has been subjected to the heating procedure, and a monovalent montmorillonite which hydrates and disperses comparatively slowly hydrates and disperses at a still lower rate after it has been subjected to the heating procedure. The monovalent montmorillonite subjected to such heating procedure is capable of being mixed with water in such concentration to form a slurry which originally is relatively fluid and pumpable and may be readily placed in a well bore hole at a desired location but which with time increases in viscosity until it is comparatively solid and firm and sets at its location within the well bore hole.

The monovalent montmorillonite may be sodium montmorillonite, potassium montmorillonite, lithium montmorillonite, etc. It is preferred, however, to employ sodium montmoriilonite. The monovalent montmorillonite may be a synthetic or a natural monovalent montmorillonite. Additionally, it may be in admixture with other solid material as in clays and other natural sources of monovalent montmorillonites. Satisfactory results are obtained employing natural sodium montmorillonite such as sodium bentonite. Sodium, potassium, and lithium montmorillonites are alkali metal montmorillonites.

A specific example of a suitable monovalent montmorillonite is the monovalent montmorillonite contained in a clay obtained from surface deposits in the White River area in southwestern North Dakota. This clay, which we term "White River" clay, is characterized in that it consists substantially entirely of montmorillonites, quartz, cristobalite, feldspar, and contains a small amount of water-soluble salts. An analysis of a typical sample of White River clay is as follows:

| Mineral: | Weight percent |
|---|---|
| Quartz | 18 |
| Cristobalite | 7 |
| Feldspar | 4 |
| Sodium montmorillonite | 50 |
| Bivalent montmorillonites | 20 |
| Water-soluble salts | 0.2 |

The water-soluble salts consist primarily of calcium bicarbonate, sodium bicarbonate, sodium sulfate, aluminum sulfate, and sodium chloride.

Another specific example of a suitable monovalent montmorillonite is the monovalent montmorillonite contained in a clay mined from a source in California and known commercially as "McKittrick Light" clay. McKittrick Light clay is characterized in that it contains quartz, cristobalite, feldspar, analcite, calcite, dolomite, illite, montmorillonite, and water-soluble salts. Practically all of the montmorillonite is sodium montmorillonite. An analysis of a typical sample of McKittrick Light clay is as follows:

| Mineral: | Weight percent |
|---|---|
| Quartz | 12 |
| Cristobalite | 2 |
| Feldspar | 12 |
| Analcite | 1 |
| Calcite | 7 |
| Dolomite | 2 |
| Illite | 25 |
| Sodium montmorillonite | 37 |
| Water-soluble salts | 2 |

The water-soluble salts consist primarily of calcium carbonate, sodium carbonate, sodium bicarbonate, sodium sulfate, and sodium chloride.

Water slurries of a solid material such as a monovalent montmorillonite possess such physical properties as plastic viscosity, yield value, and gel strength. The plastic viscosity of most of these slurries, where the solids concentration is not excessive, can be expressed approximately as an Arrhenius function, as follows:

$$u_p = u_m e^{BC_v}$$

where $u_p$ = the plastic viscosity of the suspension,
$u_m$ = the viscosity of the water,
$C_v$ = volume fraction of the slurry consisting of solids,
$B$ = a number characteristic of the suspended solids, and
$e$ = the base of the natural logarithms.

For a slurry where the plastic viscosity increases with time, B is a function of time and, where the increase in the plastic viscosity depends upon temperature, B is a function of temperature. Assuming that $B(0)$ is the observed value at zero time, i. e., immediately upon admixture of the solid material and the water, and $B(t, T)$ is the observed value after a period of time $t$ has elapsed, during which time the temperature of the slurry has been maintained at T, then the ratio of the plastic viscosity at the time $t$ ($u_p(t, T)$) to the initial plastic viscosity ($u_p(0)$) is $$\frac{u_p(t,T)}{u_p(0)} = e^{[B(t,T)-B(0)]C_v}$$

The quantity $[B(t, T) - B(0)]$ is a measure of the ability of the monovalent montmorillonite to increase the plastic viscosity of a slurry thereof in the time $t$ and is independent of the concentration of the solids in the slurry.

For the treatment of a well bore hole in the earth, a slurry comprising water and the monovalent montmorillonite which has been subjected to heating is placed in the well bore hole at a desired location. The slurry is permitted to remain at this location and to set therein. Accordingly, the slurry must retain its fluidity and pumpability for such time after mixing that it may be placed at the desired location in the well bore hole. Additionally, the slurry, after being placed at the desired location in the well bore hole must set to a degree of firmness, or attain a shear strength, such that it will withstand the ordinary stresses imposed by pressure differentials across it within the well bore hole. We have found that, in order to obtain a monovalent montmorillonite slurry which is satisfactory from the standpoints of retaining fluidity and pumpability and thereafter attaining a desired shear strength, the quantity $[B(t, T) - B(0)]$, where $t$ is 16 hours and T is 170° F., must be at least 40 for the monovalent montmorillonite after the heating treatment.

For any given monovalent montmorillonite, the value of the quantity $[B(t, T) - B(0)]$ will depend upon the amount of interlaminar water removed by the heating procedure and this in turn, for any given monovalent montmorillonite, will depend upon the time and temperature of the heating procedure. Additionally, the maximum value of the quantity $[B(t, T) - B(0)]$ attained by any time and temperature of the heating procedure will depend upon the monovalent montmorillonite. Thus, the time and temperature of heating to attain a given value in excess of 40 for the quantity $[B(t, T) - B(0)]$ where $t$ is 16 hours and T is 170° F., depend upon the monovalent montmorillonite. Generally, the time and temperature of heating required to attain a desired value of the quantity $[B(t, T) - B(0)]$ for a given monovalent montmorillonite may be determined by heating samples of the monovalent montmorillonite at various temperatures and for various periods of time and determining the value of the quantity $[B(t, T) - B(0)]$ by admixing each sample after heating with water and measuring the plastic viscosity of the resulting slurry immediately after mixing and again after aging for 16 hours at a temperature of 170° F. From the information thus obtained, the time and temperature of heating required for other values of the quantity $[B(t, T) - B(0)]$ may be estimated. Additionally, the maximum value of the quantity $$[B(t, T) - B(0)]$$

that may be attained for any given monovalent montmorillonite may be similarly determined. It has been found, for example, that satisfactory results are obtained by heating White River clay at a temperature between about 600 and 700° F. for a period of two hours, by heating McKittrick Light clay at a temperature between about 400 and 500° F. for several minutes, and by heating bentonite at a temperature of 900 to 1000° F. for a period between 8 and 24 hours. However, comparable results may also be obtained by heating each of these clays at higher temperatures for shorter times or at lower temperatures for longer times.

As previously stated, the time and temperature of the heating procedure should be such that at least a portion of the interlaminar water is removed from the monovalent montmorillonite. However, the time and temperature of the heating procedure should be such that a minimum of constitution water is removed from the monovalent montmorillonite since, as it has been found, removal of constitution water has an adverse effect upon the value of the quantity $[B(t, T) - B(0)]$ attained by monovalent montmorillonite as a result of the heating procedure. Constitution water is water formed from hydroxyl groups which exist within the crystal structure of the montmorillonite laminae. The removal of a small amount of constitution water does not greatly affect the value of the quantity $[B(t, T) - B(0)]$. On the other hand, prolonged heating at high temperatures resulting removal of appreciable quantities of constitution water reduces the value of the quantity $[B(t, T) - B(0)]$ to a greater extent than removal of the interlaminar water increases its value. Accordingly, the time and temperature of the heating procedure should not be so great that any improvement in the value of the quantity $[B(t, T)-B(0)]$ by removal of interlaminar water otherwise obtained is compensated by a reduction as a result of removal of constitution water.

While the removal of a small amount of constitution water from the monovalent montmorillonite does not seriously affect the value of the quantity $$[B(t, T)-B(0)]$$

it is preferred that the time and temperature of the heating procedure be such as to avoid any removal of constitution water. The maximum time and temperature of the heating procedure that may be employed without removal of constitution water may be determined by heating samples of the monovalent montmorillonite at various temperatures until constant weight of each sample is attained. A curve of temperature versus the weight of the monovalent montmorillonite will show, as the temperature is increased above 212° F., an initial drop indicating removal of interlaminar water, a substantially flat portion, and a subsequent drop indicating removal of constitution water. Temperatures of heating without removal of constitution water may be any of those temperatures lower than the second drop on the curve and heating may be continued for any desired length of time at these temperatures.

As stated hereinabove, in order to obtain a slurry which is satisfactory from the standpoints of retaining fluidity and pumpability and attaining desired shear strength, the monovalent montmorillonite, after the heating procedure, must have a value of at least 40 for the quantity $[B(t, T)-B(0)]$, where $t$ is 16 hours and T is 170° F. The quantity $[B(t, T)-B(0)]$ is related to the plastic viscosity of the slurry. The yield value and the gel strength of a slurry should also be considered in determining the suitability of a slurry for the treatment of a well bore hole in the earth but ordinarily if the plastic viscosity is satisfactory from this standpoint the yield value and gel strength will also be satisfactory from this standpoint. Further, the value of the quantity $[B(t, T)-B(0)]$ is a measure only of the rate of the increase in plastic viscosity with time and, as also stated hereinabove for a satisfactory treatment of a well bore hole in the earth, the slurry must have an initial viscosity such that the slurry is fluid and pumpable and the slurry must attain a set after placing in the well bore hole such that the slurry will withstand the stresses imposed by pressure differentials across it within the well bore hole. For the treatment of well bore holes in the earth, generally satisfactory results are obtained where the slurry, after stirring for 60 minutes at 130° F. following its preparation, has a viscosity not in excess of 100 poises, this viscosity being measured by the Halliburton Consistometer, and attains after 24 hours of aging at a temperature of 170° F. following its preparation a shear strength at least as great as 175 pounds per square foot.

The shear strength of the set slurry is a function of the total quantity of solid materials in the slurry as well as a function of the quantity of monovalent montmorillonite in the slurry. Monovalent montmorillonite per se, which has been subjected to the heating procedure for the removal of interlaminar water, ordinarily will not provide a slurry whose viscosity after stirring for 60 minutes at 130° F. following preparation will not be in excess of 100 poises and whose shear strength after 24 hours of aging at 170° F. following preparation will be at least as great as 175 pounds per square foot. More specifically, with slurries containing only monovalent montmorillonite, where sufficient monovalent montmorillonite is employed to obtain a shear strength of the set slurry at least as great as 175 pounds per square foot after 24 hours of aging at 170° F. following preparation, the viscosity of the slurry after stirring for 60 minutes at 130° F. following preparation will exceed 100 poises. Conversely, where monovalent montmorillonite is employed in sufficiently small amount such that the viscosity of the slurry after stirring for 60 minutes at 130° F. following preparation is not in excess of 100 poises, the shear strength after 24 hours of aging at 170° F. following preparation will not be as great as 175 pounds per square foot.

For the treatment of a well bore hole in the earth, the slurry must contain not less than about 15% but not more than about 20% by weight of monovalent montmorillonite which has been heated for the removal of interlaminar water so that the value of the quantity $[B(t, T)-B(0)]$ is at least 40, where $t$ is 16 hours and T is 170° F. Additionally, the slurry must contain not less than about 30% but not more than about 45% by weight of total solids, which amount of total solids includes the monovalent montmorillonite. The additional amount of total solids may be any solid, water-insoluble, inorganic material incapable of hydrating and dispersing in the presence of liquid water. This material may be the earth material naturally associated with the monovalent montmorillonite where a clay is employed as the source of the monovalent montmorillonite. This material may also be a material such as calcium montmorillonite, magnesium montmorillonite, quartz and other forms of silica, silica-alumina, etc. Where a clay is employed as the source of monovalent montmorillonite and the clay contains insufficient amounts of materials in addition to the monovalent montmorillonite to provide a slurry upon addition of water which has the desired amount of monovalent montmorillonite and total solids, additional solids may be admixed with the clay. Where additional amounts of solid, water-insoluble, inorganic material are employed, the material desirably should have a particle size not greater than about 30 mesh (U. S. Sieve Series).

The heating procedure applied to the monovalent montmorillonite may be carried out in any suitable type heating apparatus. For example, the monovalent montmorillonite may be heated in a gas-fired kiln or similar type of apparatus. The heating procedure may be carried out immediately prior to the use of the monovalent montmorillonite in a slurry for the treatment of a well bore hole in the earth or the heating treatment may be carried out at a central point or points and the heat treated monovalent montmorillonite shipped in bulk or in suitable containers, such as sacks, to the desired location or to suitable distribution points. Where the monovalent montmorillonite does not contain naturally associated solid, water-insoluble, inorganic materials in amounts such that the slurries prepared therefrom will have the desired amounts of total solids, solid, water-insoluble, inorganic materials may be added to the monovalent montmorillonite following the heating procedure so that the product shipped in bulk or in containers may contain the proper proportion of monovalent montmorillonite and total solids for the preparation of a slurry for the treatment of a well bore hole by addition of the proper amount of water.

Appreciable amounts of water-soluble salts, such as sodium chloride, etc., in the monovalent montmorillonite, in the solid, water-insoluble, inorganic materials added thereto where required, or in the water employed for preparing the slurry, will result in the attainment of an undesirably high initial viscosity of the slurry. Initially high viscosity, as a result of this and other causes, may be corrected by the addition of a water-soluble salt of a polyphosphoric acid or a complex metaphosphoric acid. Water-soluble salts of hexametaphosphoric acid, pyrophosphoric acid, triphosphoric acid, and tetraphosphoric acid may be employed. Tetrasodium pyrophosphate has been found to be particularly suitable. The concentration of phosphoric acid salt in the slurry may vary between about 0.01 and 0.40% by weight of the monovalent montmorillonite. The phosphoric acid salt, if desired, may be admixed with the monovalent montmorillonite immediately after heating and included as an ingredient of a composition for the preparation of a slurry for the treatment of a well bore hole in the earth, the composition comprising monovalent montmorillonite and solid, water-insoluble, inorganic material incapable of hydrating and dispersing in the presence of liquid water.

For correction of lost circulation, the slurry is pumped or otherwise placed in the well bore hole opposite the loss zone and into the interstices or fractures of the formation or formations constituting the loss zone. Generally, these operations are similar to the operations involved in correcting lost circulation with hydraulic cement. A typical operation for correction of lost circulation involves first forming the slurry containing the monovalent montmorillonite. This may be accomplished conveniently by placing the dry material in a hopper and jetting water in the desired proportion into the dry material as it leaves the hopper. The slurry thus formed is pumped directly into the drill pipe which has been run to a point opposite or as near as possible to the lost circulation zone. Normally, pumping of the slurry is continued until return of drilling fluid is obtained. However, where pumping of the slurry is continued until return of drilling fluid is obtained, the drill pipe will be filled with the slurry after completion of the operation which represents a waste of slurry. Alternately, therefore, a desired amount of the slurry may be pumped into the drill pipe followed by drilling fluid to displace the slurry therefrom. If correction of lost circulation is not immediately obtained with the amount of slurry employed, a short waiting time, which may be of the order of 30 minutes, may be allowed for the slurry to increase in viscosity and to set partially and then drilling fluid is pumped through the drill pipe to determine whether return of drilling fluid has been obtained. If drilling fluid return is not obtained, further slurry may be placed in the lost circulation zone.

When return of drilling fluid has been obtained, a pressure is desirably imposed, with the preventers closed, within the annulus between the drill pipe and the walls of the bore hole or casing, the pressure being equal to the pressure which the loss zone is expected to withstand during further drilling operations, in order to effect a better bond between the slurry and the formation or formations constituting the lost circulation zone.

After correction of lost circulation is effected, the slurry is permitted to set in its position in the well bore hole. The time required to obtain a desired degree of set is dependent upon the temperature within the bore hole at the location of the slurry. Where the bore hole temperature is above about 150° F., a waiting time of one to three hours may result in attainment of a satisfactory degree of set. Where the bore hole temperature is below about 150° F., a proportionately greater waiting time, which may be between 10 and 24 hours, will be required. If desired, the waiting time required to obtain a desired degree of set can be determined by maintaining samples of the slurry at the bore hole temperature and measuring the time required for the samples to attain the desired degree of set. Following setting of the slurry, the plug formed by the slurry in the well bore hole is drilled out and drilling of the well is continued.

To protect earth formations from the effects of recompletion or acidizing treatments applied to an overlying formation, the slurry containing the monovalent montmorillonite subjected to the heating procedure is placed in the well bore hole to fill completely the well bore hole along the formation to be protected. The slurry is permitted to set in this location for a time depending upon the temperature of the well bore hole, and, after the slurry has set, the recompletion or acidizing operation may be carried out above the section of the well bore hole filled with the slurry. Thereafter, the set slurry is removed from the well bore hole, as by drilling.

In water flooding operations and gas drive operations, selective plugging of a high permeability formation is effected by placing the slurry in the well bore hole opposite the formation, squeezing the slurry into the formation, and, after permitting the slurry to set within the formation, the setting time depending upon the temperature in the formation, drilling through the plug formed by the slurry in the well bore hole.

Plugging of a hole or perforation in a well casing is effected by forcing the slurry into the well casing and through the hole or perforation into the annular space between the casing and the walls of the well bore hole. The slurry is permitted to set, the setting time depending upon the temperature, and the plug formed by the slurry is cleaned out of the casing. Similarly, the slurry is employed for cementing casing strings in place. For protecting casing strings from corrosion, a sheath of the slurry is placed around the string at points subject to corrosion.

The following examples will be illustrative of the invention.

EXAMPLE I

This example will illustrate the improvement in the value of the quantity $[B(t, T) - B(0)]$ obtained by the heating procedure for a natural sodium bentonite consisting practically entirely of sodium montmorillonite and having a value of the quantity $[B(t, T) - B(0)]$ of 16. The sodium bentonite was heated in an oven at different temperatures and for different times after which samples of the bentonite were admixed with water to form a slurry containing 7.5 percent by weight of the sodium bentonite. The plastic viscosity of each of the resultant slurries was measured employing a Haliburton Consistometer immediately after preparation. Each slurry was then aged for 16 hours at a temperature of 170° F., and the plastic viscosity of each of the slurries was again measured. From the two values of the plastic viscosities for each sample, the value of the quantity $[B(t, T) - B(0)]$ was determined. The table following gives the temperature and time of the heating procedure for each sample, the plastic viscosities of each slurry prior and subsequent to aging, and the value of the quantity $[B(t, T) - B(0)]$.

*Table I*

| Temperature—° F. | 500 | 875 | 925 |
|---|---|---|---|
| Heating Time—1 Hour: | | | |
| Plastic Viscosity, Centipoises— | | | |
| Before Aging | 33 | 17 | 12 |
| After Aging | 60 | 72 | 71 |
| $[B(t, T) - B(0)]$ | 20 | 50 | 61 |
| Heating Time—2 Hours: | | | |
| Plastic Viscosity, Centiposes— | | | |
| Before Aging | 25 | 7.5 | 2.75 |
| After Aging | 55 | 60 | 18 |
| $[B(t, T) - B(0)]$ | 27 | 71 | 64 |
| Heating Time—4 Hours: | | | |
| Plastic Viscosity, Centipoises— | | | |
| Before Aging | 17 | 2.75 | 1.75 |
| After Aging | 54 | 39 | 6.5 |
| $[B(t, T) - B(0)]$ | 40 | 91 | 45 |
| Heating Time—8 Hours: | | | |
| Plastic Viscosity, Centipoises— | | | |
| Before Aging | 16 | 2.25 | 1.75 |
| After Aging | 48 | 34 | 5 |
| $[B(t, T) - B(0)]$ | 37 | 93 | 36 |

It will be observed from the table that a value of the quantity $[B(t, T) - B(0)]$ in excess of 40 was not obtained by heating at 500° F. Heating at 875° F. for one to eight hours resulted in the attainment of values of the quantity $[B(t, T) - B(0)]$ in excess of 40. Heating at 925° F. for one, two, and four hours resulted in attainment of values of the quantity $[B(t, T) - B(0)]$ in excess of 40 but the values attained were less than the value attained by heating at 875° F. for eight hours. Heating at 925° F. for four hours or more removed constitution water as indicated by the decrease in the value of the quantity $[B(t, T) - B(0)]$ with heating after four hours.

EXAMPLE II

This example will illustrate the effect of the heating procedure on the value of the quantity $[B(t, T) - B(0)]$ for the same type of sodium bentonite as in Example I except that the sodium bentonite was first subjected to dialysis for the removal of electrolytes. The value of the quantity [B(t, T)−B(0)] of the purified bentonite was 13. The samples of the purified bentonite were heated, slurries were prepared from each sample, the plastic viscosity of each slurry was measured, each slurry was aged, and the plastic viscosity of each slurry was again measured in the same manner as described in Example I. The table gives the time and temperature of the heating procedure, the plastic viscosities of the slurries, and the values of the quantity [B(t, T)−B(0)].

Table II

| Temperature—° F | 500 | 600 | 800 | 1,000 |
|---|---|---|---|---|
| Heating Time—1 Hour: | | | | |
| Plastic Viscosity, Centipoises— | | | | |
| Before Aging | 45 | 31 | 19 | 2 |
| After Aging | 90 | 90 | 84 | 75 |
| [B(t, T)−B(0)] | 24 | 36 | 51 | 124 |
| Heating Time—2 Hours: | | | | |
| Plastic Viscosity, Centipoises— | | | | |
| Before Aging | 36 | 30 | 6 | 1 |
| After Aging | 98 | 92 | 67 | 2 |
| [B(t, T)−B(0)] | 35 | 38 | 83 | 24 |
| Heating Time—4 Hours: | | | | |
| Plastic Viscosity, Centipoises— | | | | |
| Before Aging | 35 | 20 | 2 | 1 |
| After Aging | 93 | 104 | 55 | 1 |
| [B(t, T)−B(0)] | 33 | 56 | 113 | 0 |
| Heating Time—8 Hours: | | | | |
| Plastic Viscosity, Centipoises— | | | | |
| Before Aging | 31 | 33 | 2 | 1 |
| After Aging | 92 | 107 | 47 | 1 |
| [B(t, T)−B(0)] | 37 | 57 | 108 | 0 |

It will be observed from the table that the value of the quantity [B(t, T)−B(0)] was 24, 35, 33, and 37 for the samples of sodium bentonite heated at 500° F. for one, two, four, and eight hours, respectively, and 36 and 38 for the samples of sodium bentonite heated at 600° F. for one and two hours, respectively. Accordingly, heating at 500° F. up to eight hours and at 600° F. up to two hours was insufficient to render the sodium bentonite satisfactory for the preparation of a slurry for the treatment of well bore holes in the earth. However, it will be observed that heating at 600° F. for four hours and eight hours, heating at 800° F. for one hour to eight hours, and heating at 1,000° F. for one hour increased the value of the quantity [B(t, T)−B(0)] above 40. Heating at a temperature of 1,000° F. for one hour produced the maximum value of the quantity [B(t, T)−B(0)], namely, a value of 124, for the times and temperatures employed in the example. Heating at 1,000° F. for greater lengths of time than one hour, however, resulted in removal of constitution water from the sodium bentonite as indicated by the precipitous decrease in the value of the quantity [B(t, T)−B(0)], the value dropping to 24 and to zero with two and four hours of heating, respectively.

EXAMPLE III

This example will illustrate the effect of the heating procedure on the value of the quantity [B(t, T)−B(0)] for a commercial clay containing about 90 weight percent of sodium montmorillonite and having a value for the quantity [B(t, T)−B(0)] of 12. The samples of clay were heated in an oven at different times and at different temperatures similarly as in the two examples above. After heating, however, the samples were admixed with water to form a slurry containing 10 percent by weight of the clay. The plastic viscosity of each sample was measured after preparation and again after aging for 16 hours at 170° F. The table gives the time and temperature of the heating procedure, the plastic viscosities of the slurries, and the values of the quantity [B(t, T)−B(0)].

Table III

| Temperature—° F | 900 | 950 | 1,000 |
|---|---|---|---|
| Heating Time—1 Hour: | | | |
| Plastic Viscosity, Centipoises— | | | |
| Before Aging | 67 | 60 | 9 |
| After Aging | 106 | 102 | 91 |
| [B(t, T)−B(0)] | 12 | 13 | 71 |
| Heating Time—2 Hours: | | | |
| Plastic Viscosity, Centipoises— | | | |
| Before Aging | 53 | 8 | 1.5 |
| After Aging | 105 | 74 | 26 |
| [B(t, T)−B(0)] | 17 | 58 | 74 |
| Heating Time—4 Hours: | | | |
| Plastic Viscosity, Centipoises— | | | |
| Before Aging | 21 | 4 | 1.4 |
| After Aging | 111 | 56 | 5.5 |
| [B(t, T)−B(0)] | 43 | 67 | 35 |
| Heating Time—8 Hours: | | | |
| Plastic Viscosity, Centipoises— | | | |
| Before Aging | 14 | 2.5 | 2.5 |
| After Aging | 128 | 29 | 1.2 |
| [B(t, T)−B(0)] | 56 | 63 | 19 |

With this clay, the value of the quantity

[B(t, T)−B(0)]

was not improved by heating at 900° F. for one hour. Heating at the same temperature for two hours increased the value of the quantity [B(t, T)−B(0)] to 17, however, and heating at this same temperature for four hours and eight hours increased the quantity [B(t, T)−B(0)] to satisfactory values, namely, 43 and 56, respectively. Heating at 950° F. for one hour did not increase the quantity [B(t, T)−B(0)] to satisfactory values but heating at this temperature for two, four, and eight hours increased this quantity to satisfactory values. Heating at 1,000° F. for one hour was more effective than heating at 950° F. for four hours or for eight hours and heating at 1,000° F. for two hours produced the maximum value of the quantity [B(t, T)−B(0)] obtained in the example. However, heating for more than four hours resulted in loss of constitution water as indicated by the precipitous decrease in the value of the quantity [B(t, T)−B(0)].

EXAMPLE IV

This example will be illustrative of the properties of slurries containing sodium bentonite previously subjected to heating.

Samples of sodium bentonite were heated for different times and at different temperatures in an oven. After heating, a slurry was made of each of the samples of sodium bentonite. A commercial clay containing about 70 percent by weight of calcium montmorillonite was added to each of the slurries as an additional solid material to increase the total solids content of each of the slurries. Following preparation of the slurries, tetrasodium pyrophosphate was added to each in an amount of 0.1 weight percent of the total solids. The slurries were then maintained at 130° F. and continually stirred until each attained a viscosity of 100 poises. Thereafter, the slurries were maintained quiescent at 170° F. for an aging period of twenty-four hours and the shear strength measured. Fresh slurries could have been made of each of the samples of sodium bentonite and these fresh slurries aged quiescent at 170° F. for twenty-four hours. However, in order to obtain uniform admixture of the clay with the water and avoid settling of the clay in the slurry, lengthy stirring is usually required. The additional stirring can be avoided by aging the slurries previously maintained at 130° F. and stirred until a viscosity of 100 poises was attained at 170° F. for twenty-four hours. The table gives the temperature and the time of the heating of the sodium montmorillonite, the amount of clay, the total amount of solids in the slurries, the time required to attain a viscosity of 100 poises, and the shear strength after aging for twenty-four hours at 170° F.

Table IV

| Temperature—°F. | 950 | 950 | 950 | 1,000 | 1,000 |
|---|---|---|---|---|---|
| Heating Time, Hours | 24 | 24 | 24 | 8 | 24 |
| Weight Percent Sodium Montmorillonite | 12 | 15 | 18.5 | 13 | 20 |
| Weight Percent Commercial Clay | 18 | 12 | 6.5 | 22 | 18 |
| Weight Percent Total Solids | 30 | 27 | 25 | 35 | 38 |
| Time to Attain Viscosity of 100 Poises, Minutes | 60 | 60 | 60 | 60 | 60 |
| Shear Strength, Pounds per Square Foot | 203 | 203 | 190 | 216 | 216 |

It will be observed from the table that each slurry required 60 minutes of stirring at 130° F. before the viscosity was as high as 100 poises. Each of these slurries is satisfactory for the treatment of a well bore hole in the earth.

EXAMPLE V

This example is illustrative of the properties of slurries of White River clay which had previously been subjected to heating at different temperatures. Samples of White River clay were heated in an oven at three different temperatures for two hours and thereafter slurries were prepared from each of the samples, each slurry containing different weight percents of the clay. The time required for each slurry to attain a viscosity of 100 poises while stirred and maintained at 130° F. was measured and the shear strength was measured after aging for twenty-four hours at 130° F. The table gives the temperature of heating, the amount of clay in each of the slurries, the time required for each slurry to attain a viscosity of 100 poises, and the shear strength after aging.

Table V

| Temperature—° F. | | 400 | 600 | 700 | 800 |
|---|---|---|---|---|---|
| Heating Time, Hours | | 2 | 2 | 2 | 2 |
| Weight Percent Clay | 24.2 | 27.8 | 30.6 | 33.4 | 40.2 |
| Time to Attain Viscosity of 100 Poises, Minutes | 60 | 60 | 60 | 60 | 60 |
| Shear Strength, Pounds per Square Foot | 125 | 187 | 195 | 203 | 273 |

Each of the slurries, as will be observed from the table, required 60 minutes of stirring at 130° F. before a viscosity of 100 poises was attained. The shear strengths of the slurries containing clays heated for two hours at 400°, 600°, 700°, and 800° F. were greater than 175 pounds per square foot after aging at 170° F. for twenty-four hours. Each of these slurries is suitable for the treatment of well bore holes in the earth. On the other hand, the shear strength of the slurry prepared from the unheated clay was less than 175 pounds per square foot after aging at 170° F. for twenty-four hours and this slurry is unsuitable for the treatment of well bore holes in the earth.

Having thus described our invention, it will be understood that such description has been given by way of illustration and example and not by way of limitation, reference for the latter purpose being had to the appended claims.

We claim:

1. A composition for use in the treatment of a well bore hole in the earth comprising alkali metal montmorillonite which has been heated at a temperature between 400° F. and 1000° F. for a time between several minutes and 24 hours such that at least a portion of the interlaminar water has been removed therefrom and the value of the quantity $[B(t, T) - B(0)]$ is at least 40 in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

2. A composition for use in the treatment of a well bore hole in the earth comprising in admixture a solid, water-insoluble inorganic material incapable of hydrating and dispersing in the presence of liquid water and alkali metal montmorillonite which has been heated at a temperature between 400° F. and 1000° F. for a time between several minutes and 24 hours such that at least a portion of the interlaminar water has been removed therefrom and the value of the quantity $[B(t, T) - B(0)]$ is at least 40 in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

3. A method for treating a well bore hole in the earth comprising placing in said well bore hole at a desired location therein a slurry comprising water and alkali metal montmorillonite which has been previously subjected to heating at a temperature between 400° F. and 1000° F. for a time between several minutes and 24 hours such that at least a portion of the interlaminar water has been removed therefrom and the value of the quantity $[B(t, T) - B(0)]$ is at least 40 in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

4. A method for treating a well bore hole in the earth comprising placing in said well bore hole at a desired location therein a slurry comprising water, a solid, water-insoluble inorganic material incapable of hydrating and dispersing in the presence of liquid water, and alkali metal montmorillonite which has been previously subjected to heating at a temperature between 400° F. and 1000° F. for a time between several minutes and 24 hours such that at least a portion of the interlaminar water has been removed therefrom and the value of the quantity $[B(t, T) - B(0)]$ is at least 40 in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

5. A composition for use in the treatment of a well bore hole in the earth comprising in admixture a solid, water-insoluble inorganic material incapable of hydrating and dispersing in the presence of liquid water and in an amount not less than about 15 and not more than about 20 parts by weight for each amount of said mixture of not less than about 30 and not more than about 45 parts by weight alkali metal montmorillonite which has been heated at a temperature between 400° F. and 1000° F. for a time between several minutes and 24 hours such that at least a portion of the interlaminar water has been removed therefrom and the value of the quantity

[B(t, T)−B(0)] is at least 40 in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F.

6. A composition for use in the treatment of a well bore hole in the earth comprising a slurry containing water and solids, said solids comprising solid, water-insoluble inorganic material incapable of hydrating and dispersing in the presence of liquid water and alkali metal montmorillonite which has been previously subjected to heating at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., said solids being in an amount not less than about 30 but not more than about 45 percent by weight of said slurry and said alkali metal montmorillonite being in an amount not less than about 15 but not more than about 20 percent by weight of said slurry.

7. The method for treating a well bore hole in the earth comprising heating alkali metal montmorillonite at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., thereafter forming a slurry by admixing said alkali metal montmorillonite with water, said alkali metal montmorillonite being in an amount not less than about 15 but not more than about 20 percent by weight of said slurry, and placing said slurry at a desired location in said well bore hole.

8. A method for treating a well bore hole in the earth comprising forming a slurry by admixing water and alkali metal montmorillonite which has been heated at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., and placing said slurry at a desired location in said well bore hole.

9. A method for treating a well bore hole in the earth comprising forming a slurry by admixing water, a solid, water-insoluble inorganic material incapable of hydrating and dispersing in the presence of liquid water, and alkali metal montmorillonite which has been previously subjected to heating at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., and placing said slurry at a desired location in said well bore hole.

10. A method for treating a well bore hole in the earth comprising forming a slurry by admixing water and solids, said solids comprising solid, water-insoluble inorganic material incapable of hydrating and dispersing in the presence of liquid water and alkali metal montmorillonite which has been previously subjected to heating at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., said solids being in an amount not less than about 30 but not more than about 45 percent by weight of said slurry and said alkali metal montmorillonite being in an amount not less than about 15 but not more than about 20 percent by weight of said slurry and placing said slurry at a desired location in said well bore hole.

11. The method for treating a well bore hole in the earth comprising heating alkali metal montmorillonite at a temperature between 400° F. and 1000° F. for a time between several minutes and 24 hours such that at least a portion of the interlaminar water has been removed therefrom and the value of the quantity [B(t, T)−B(0)] is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and B(0) is the value of said number initially upon formation of said slurry and B(t, T) is the value of said number after said slurry has aged for 16 hours at 170° F., thereafter forming a slurry by admixing said alkali metal montmorillonite with water, and placing said slurry at a desired location in said well bore hole.

12. The method for treating a well bore hole in the earth comprising heating alkali metal montmorillonite at a temperature between 400° F. and 1000° F. for a time between several minutes and 24 hours such that at least a portion of the interlaminar water has been removed therefrom and the value of the quantity [B(t, T)−B(0)]

is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F., thereafter forming a slurry by admixing said alkali metal montmorillonite with water and solid, water-insoluble inorganic material incapable of hydrating and dispersing in the presence of liquid water, and placing said slurry at a desired location in said well bore hole.

13. The method for treating a well bore hole in the earth comprising heating alkali metal montmorillonite at a temperature between 400° F. and 1000° F. for a time between several minutes and 24 hours such that at least a portion of the interlaminar water has been removed therefrom and the value of the quantity $[B(t, T) - B(0)]$ is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F., forming a slurry by admixing said alkali metal montmorillonite with water and solid, water-insoluble inorganic material incapable of hydrating and dispersing in the presence of liquid water, said solid material and said alkali metal montmorillonite being in an amount not less than about 30 and not more than about 45 percent by weight of said slurry, and said alkali metal montmorillonite being in an amount not less than about 15 percent but not more than about 20 percent by weight, of said slurry, and placing said slurry at a desired location in said well bore hole.

14. A method for treating a well bore hole in the earth comprising placing in said well bore hole at a desired location therein a slurry comprising water and solids, said solids comprising solid, water-insoluble inorganic material incapable of hydrating and dispersing in the presence of liquid water and alkali metal montmorillonite which has been previously subjected to heating at a temperature between 400° F. and 1000° F. for a time between several minutes and 24 hours such that at least a portion of the interlaminar water has been removed therefrom and the value of the quantity $[B(t, T) - B(0)]$ is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F., said solids being in an amount not less than about 30 but not more than about 45 percent by weight of said slurry and said alkali metal montmorillonite being in an amount not less than about 15 but not more than about 20 percent by weight of said slurry.

15. The method for treating a well bore hole in the earth comprising placing in said well bore hole at a desired location therein a slurry comprising water and in an amount not less than about 15 but not more than about 20 percent by weight of said slurry alkali metal montmorillonite which has been previously subjected to heating at a temperature between 400° F. and 1000° F. for a time between several minutes and 24 hours such that at least a portion of the interlaminar water has been removed therefrom and the value of the quantity $[B(t, T) - B(0)]$ is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

16. A composition for use in the treatment of a well bore hole in the earth comprising a slurry containing water and in an amount not less than about 15 but not more than about 20 percent by weight of said slurry alkali metal montmorillonite which has been previously subjected to heating at a temperature between 400° F. and 1000° F. for a time between several minutes and 24 hours such that a portion of the interlaminar water has been removed therefrom and the value of the quantity $[B(t, T) - B(0)]$ is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the value of said number initially upon formation of said slurry and $B(t, T)$ is the value of said number after said slurry has aged for 16 hours at 170° F.

17. The method for treating a well bore hole in the earth comprising forming a slurry by admixing water and in an amount not less than about 15 but not more than about 20 percent by weight of said slurry alkali metal montmorillonite which has been heated at a temperature between 400° F. and 1000° F. for a time between several minutes and 24 hours such that a portion of the interlaminar water has been removed therefrom and the value of the quantity $[B(t, T) - B(0)]$ is at least 40, in which quantity B is a number characteristic of said alkali metal montmorillonite in a water slurry and has a value given by the expression $u_p = u_m e^{BC_v}$, wherein $u_p$ is the plastic viscosity of said slurry, $u_m$ is the viscosity of the water in said slurry, $C_v$ is the volume fraction of said alkali metal montmorillonite in said slurry, and $e$ is the base of the natural logarithms, and $B(0)$ is the volume of said number initially upon formation of said slurry and $B(t, T)$ is the value of said number after said slurry has aged for 16 hours at 170° F., and placing said slurry at a desired location in said well bore hole.

References Cited in the file of this patent

UNITED STATES PATENTS

| | | |
|---|---|---|
| 2,233,973 | Dunn | Mar. 4, 1941 |
| 2,648,522 | Armentrout | Aug. 11, 1953 |

OTHER REFERENCES

Pages 109, 220, 329, and 330 of the book entitled "Clay Mineralogy" by Grim, 1953, "Geology Series," published by McGraw-Hill Book Company, Inc.

UNITED STATES PATENT OFFICE
Certificate of Correction

December 9, 1958

Patent No. 2,863,509    Joseph U. Messenger et al.

It is hereby certified that error appears in the above numbered patent requiring correction and that the said Letters Patent should read as corrected below.

In the grant, lines 2 and 3, and line 14, in the heading to the printed specification, line 6, name of the fourth inventor, for "Laurence M. Hermes, Jr." each occurrence, read —Lawrence M. Hermes, Jr.—; column 4, line 71, for "resulting removal" read —resulting in removal—; column 16, line 56, for "B(O) is the volume of said number" read —B(O) is the value of said number—.

Signed and sealed this 28th day of April 1959.

[SEAL]

Attest:
T. B. MORROW,
*Attesting Officer.*

ROBERT C. WATSON,
*Commissioner of Patents.*